L. S. NASH.
PNEUMATIC CONTROL SYSTEM.
APPLICATION FILED JULY 31, 1907.
1,001,429.
Patented Aug. 22, 1911.
2 SHEETS—SHEET 1.
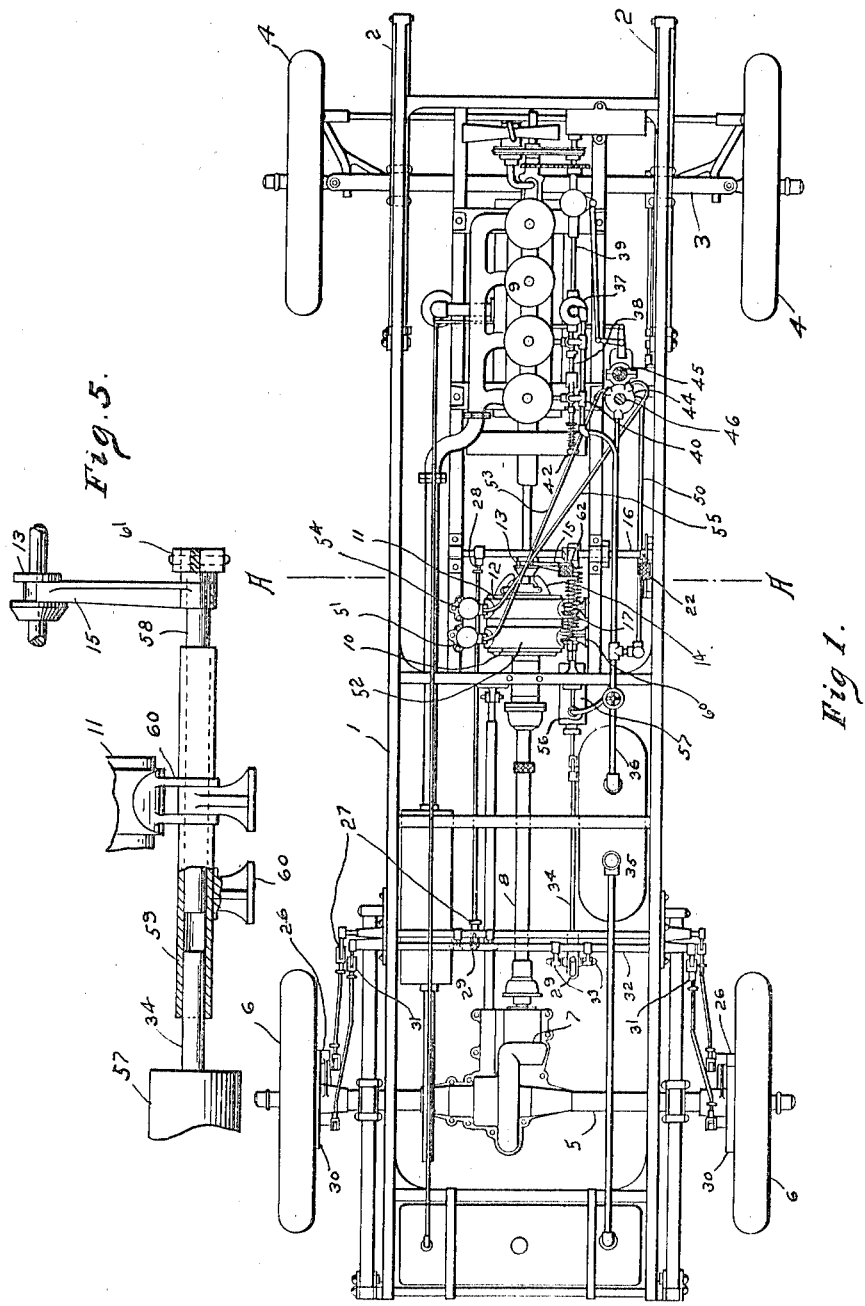
Witnesses:
Walter A. Greenburg
Anna M. Dow
Inventor
Lawrence S. Nash.
By Barthel & Barthel
Attorneys.

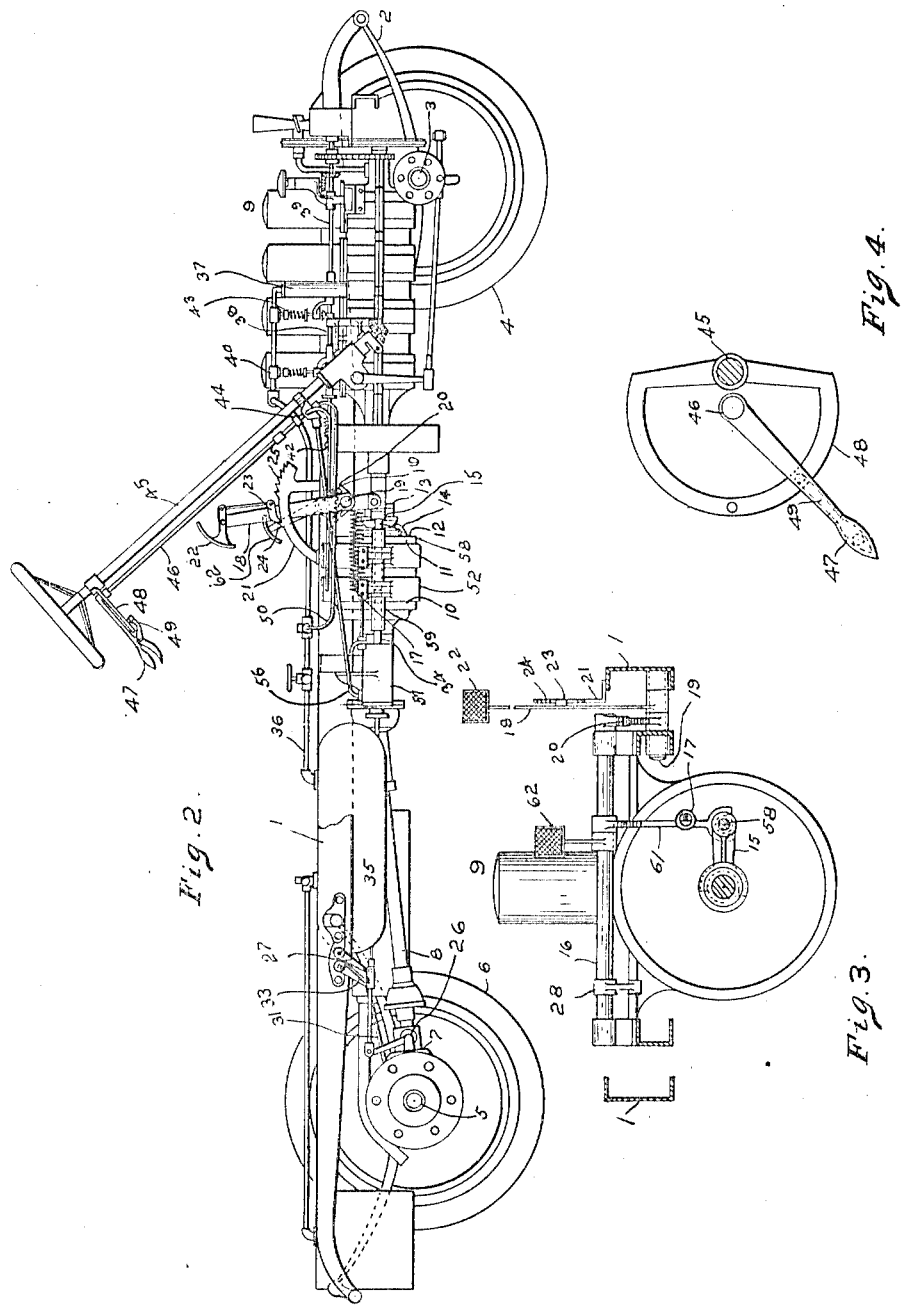

UNITED STATES PATENT OFFICE.

LAWRENCE S. NASH, OF DETROIT, MICHIGAN, ASSIGNOR TO CHARLES BRUSHABER, OF DETROIT, MICHIGAN.

PNEUMATIC CONTROL SYSTEM.

1,001,429.      Specification of Letters Patent.     Patented Aug. 22, 1911.

Application filed July 31, 1907. Serial No. 386,359.

*To all whom it may concern:*

Be it known that I, LAWRENCE S. NASH, a citizen of the United States of America, residing at Detroit, in the county of Wayne and State of Michigan, have invented certain new and useful Improvements in Pneumatic Control Systems, of which the following is a specification, reference being had therein to the accompanying drawings.
In automobiles of standard type, it is usual to have speed-changing and reversing mechanism and service brakes and emergency brakes, all of which are thrown in or out of gear or operated by levers which are brought as close as may be to the operator's station for convenient use. Each of these controlling levers must be moved by considerable exertion on the part of the operator. Particularly is this true in the case of the direct drive or high speed clutch and of the emergency brake, which latter has often to be instantly applied to avoid trouble at a time when the operator's hands should be free for the steering wheel, while the clutch must be at the same time released to aid in checking the car.

This invention relates to a pneumatic control system whereby the various mechanisms are thrown in or out and the emergency brake set by finger levers at the operator's station without any appreciable physical exertion, a clutch release being provided also which is automatic in so far as it acts positively before the brakes can be applied, the parts being so disposed that the operator does not have to move his hands from the steering wheel. A starting mechanism, adapted to be thrown in and out of operation from the operator's station, is also incorporated in the system, so that, after assuming his seat, the driver has full control for starting, reversing, or checking the car and varying the speed independent of the spark control and throttling lever, without the necessity of time consuming movements or of physical exertion, and without loss of full control of the steering gear.

The invention consists in the matters hereinafter set forth, and more particularly pointed out in the appended claims.

Referring to the drawings, Figure 1 is a plan view of the chassis, motor, transmission and running gear of an automobile, provided with an air control system which embodies the features of the invention. Fig. 2 is a view in side elevation of the automobile with the wheels removed from one side. Fig. 3 is a view in transverse section, taken on or about line A—A of Fig. 1. Fig. 4 is a view in detail of an air controlling lever and quadrant. Fig. 5 is a view in detail of the drive clutch fork and brake release.

In the drawings, 1 represents a main frame of any approved construction, which is carried by springs and like shock absorbing means 2 on a forward axle 3 and wheels 4, and on the bearings of a drive-shaft 5 having drive wheels 6. This shaft 5 is operatively connected through a compensating gear 7 and transmission shaft 8 to a fore-and-aft multi-cylinder motor 9 secured on the forward end of the frame in the customary position, the usual universal joint and slip connections being interposed and a forward low speed transmission 10, reverse 11 and direct drive clutch 12 being provided, all of these parts being of any standard design adaptable for the construction indicated.

As herein shown the operative member of the direct drive clutch 12 is a grooved collar 13 adapted to throw out expansion levers 14 when longitudinally moved against them, and so frictionally engage the parts in the usual manner of internal expansion clutches. The collar is shifted by a forked arm 15 engaging the grooved periphery and operated by a lever 61 secured to the transverse main rock-shaft 16, a spring 17 holding the arm close to the clutch and a foot-lever or pedal 62 on the shaft enabling the operator to force the collar home. The clutch is thrown out by retracting the collar through the forward movement of a second foot-lever 18 which is secured to a rock-shaft 19 parallel to the main shaft 16, and geared thereto by intermeshing segments 20 or the like. This second lever is mounted on a quadrant 21, and a pedal 22 rocking on the lever end, operates a pawl latch 23 which normally engages a detent 24 of the quadrant so disposed as to prevent the accidental engagement of the direct clutch. Similar detents 25 on the forward end of the quadrant may be used to lock the lever in an advanced position.

A set of working brakes 26 on the drive wheels 6 are operated through equalizing link and lever connections 27 with a rock-arm 28 on the rock-shaft 16, that set the brakes when the rock-arm is swung forward by the extreme advancement of the direct drive release lever 18, a slotted joint 29 allowing the direct drive pedal to move back past the point of brake release without further disturbing the brake, while the latter cannot be set without releasing the direct drive clutch. Emergency brakes 30 are secured to the drive wheels 6 and are worked by link and rock arm connections 31 with a rock-shaft 32, which is operated by equalizing rock-arms 33 linked to a rod 34.

Referring more particularly to the pneumatic controlling system, a storage and pressure tank 35 is secured at a convenient point on the frame and is connected by a feed pipe 36 to an air pump whose cylinder 37 is preferably secured parallel to and against the motor cylinders and whose plunger or piston is operated by an extension 38 of the engine commutator shaft 39, or it may be coupled to the engine in any suitable manner. The pump is preferably single action and self relieving as by the use of a check valve outlet in the cylinder head and a check valve intake in the piston, so that it is adapted to maintain a constant pressure in the tank in the usual manner. The feed pipe is connected by suitable T's 40 to the valves of a starting mechanism which are normally closed, but are opened by pushing in a spring-returned rod 42, which is connected with a pedal, not shown, so as to be within reach of the operator. The valves which are operated by tappets 43 and cams on the extension are adapted to admit air to that cylinder whose piston is at or just past the ignition or highest compression movement so as to turn the motor over until it picks itself up, the proper automatic selective action and timing being obtained through mechanism not herein described or illustrated and not forming in itself a feature of the invention.

A three-way valve 44 is secured at the base of a steering post 45 of usual design. This valve may be of any standard construction which has a rotatable closure whose spindle 46 may be extended up the steering post and be turned by a controlling lever 47 working on a flat quadrant 48, provided with a latch 49 which interlocks with the quadrant at its center, and at either end has frictional engagement which holds it against accidental movement. The valve is connected to the pressure tank 35 by a supply pipe 50 tapped into the feed pipe 36. A dash-pot or cylinder 51 is secured on the frame adjacent the forward low speed transmission 10, and its piston is connected to the operating member 52 of the transmission. A pipe 53 connects this cylinder with one of the ports of the valve 44, the parts being so disposed that the port is opened, the piston depressed and the low speed gear thrown in when the controlling lever 47 is at one end of its quadrant. The reverse drive 11 is similarly operated by the piston of a second cylinder 54 which is connected to a second port of the air valve by a pipe 55, the controlling lever 47 opening said port when at the other end of its quadrant. When the port is closed by the swinging back of the handle, the valve automatically relieves the pressure, and the usual spring in the piston cylinder releases the mechanism. The third port of the valve is connected by a pipe 56 with a horizontal brake cylinder 57 whose piston carries the emergency brake rod 34, and draws it forward so as to apply the brakes when air is admitted by turning the controlling lever 47 to the center of the quadrant when it automatically locks with the quadrant. This brake rod 34 extends through the forward end of the cylinder 57 and when projected, abuts against the end of a finger rod 58 which is integral with the direct drive clutch collar fork 15, the two rods both sliding in a bearing 59 which may be conveniently supported on the bearing brackets 60 of the transmission and reverse clutches. The rods are so adjusted that when air is applied, the brake rod 34 as it moves forward, encounters the finger rod 58 if the clutch is in, and forces it out, thus preventing the setting of the brake without the simultaneous release of the direct drive. The same movement likewise sets the working or service brakes 26 as the rock-arm 28 is swung ahead by the rocking of the shafts and their pinions. A spring in the air brake cylinders returns the parts to place, releasing the brakes, when the valve is shifted and releases the air. By this arrangement of the air system, the operator, by pressing the starting pedal, starts the motor; by turning the valve controlling lever, throws in the forward or the reverse transmission; can then if driving ahead, change speed or apply the ordinary brake with the pedals. By turning the air controlling lever he may instantly set the emergency, automatically throwing out his direct drive as he does so, or reverse the drive.

The chief feature of the invention is the bringing of all the controlling parts to a central station, whereby the operator may without removing his hands from the steering post instantly throw in or release the transmisison or apply the emergency brake. At the same time, he can, by the pedals, operate the direct drive and the ordinary brake, so that he has the car completely under control without moving from his seat, or taking his hands from the steering wheel. The efficiency and positiveness of action of the transmission mechanism are preserved, while their usual operating levers which require physical effort and movement of the operator's hands from the steering post, are replaced by the finger-lever-controlled pneumatic pistons.

The direct drive clutch engaging mechanism is herein shown as under pedal control as it is more expedient that the clutch be thrown in and out gradually in connection with the application of the ordinary brake, to give the flexibility of action required while running the car over rough places or through crowded streets, the air necessarily being almost instantaneous in its action, and being liable to impart a shock to the mechanism when the motor is at full speed. The automatic and instantaneous release of the clutch by the air, independent of and in opposition to the pedal action is an important and desirable feature.

While certain definite types of braking and transmission mechanisms and clutches are herein shown, the system is adapted to operate any style of mechanism by proper disposition, and therefore can be placed on any automobile.

Obviously the design and details of construction may be varied without departing from the spirit of the invention and I do not care to limit myself to any particular form or arrangement of parts.

What I claim as my invention is:—

1. In an automobile, change speed and reverse drive transmission mechanism, brakes, pneumatically operated means connected to the change speed and reverse mechanisms and to the brakes for throwing said mechanisms into action and for applying the brakes, and manually operable means for admitting air selectively to said pneumatically operated means adapted to automatically set the brake applying mechanism into action by admitting air thereto when shifting the air supply from the change speed to the reverse drive mechanisms.

2. In an automobile, a manually operated drive clutch, change speed and reverse drive transmission mechanisms, brakes, pneumatically operated means connected to the change speed and reverse mechanisms for throwing said mechanisms into action and for applying the brakes, and manually operable means for admitting air selectively to said pneumatically operated means, adapted to automatically set the brake applying mechanism into action by admission of air thereto when shifting the air supply from the change speed to the reverse drive mechanism, the brake setting mechanism being positively connected to the drive clutch to hold the latter in release position when the brakes are being applied.

3. In an automobile a direct clutch thrown into gear by a direct movement of an engaging member, a service brake set by a reverse movement of said member, a pedal latch lever adapted to give direct movement to said engaging member, a pedal brake lever adapted to give reverse movement to said engaging member, an emergency brake set by the direct movement of an operating member that is adapted to simultaneously give reverse movement to the said engaging member, and a direct and reverse reduction transmission, pneumatically operated means adapted to throw said direct and reverse transmissions into gear and to reciprocate said emergency operating member, means for supplying compressed air and a manually operable controlling member adapted to selectively admit air from said supply means to the several pneumatically operating means.

In testimony whereof I affix my signature in presence of two witnesses.

LAWRENCE S. NASH.

Witnesses:
C. R. STICKNEY,
OTTO F. BARTHEL.